Dec. 4, 1962    MASAKI HORI    3,066,984
DUMP VEHICLE

Filed March 21, 1960    2 Sheets-Sheet 1

INVENTOR
MASAKI HORI
BY george B. ᴀᴜʏᴇʀᴏʟʟ
ATTORNEY

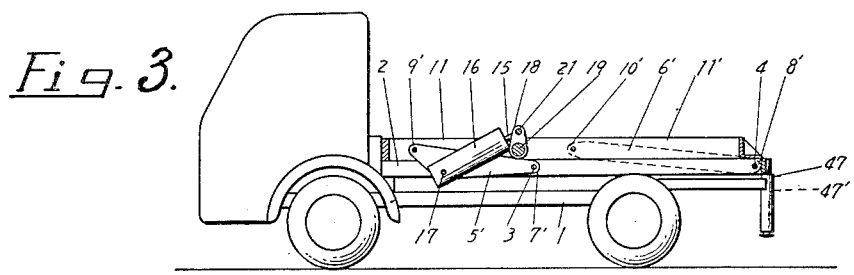
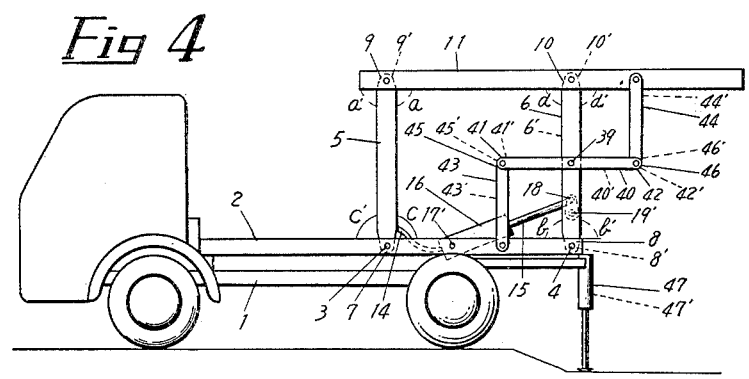
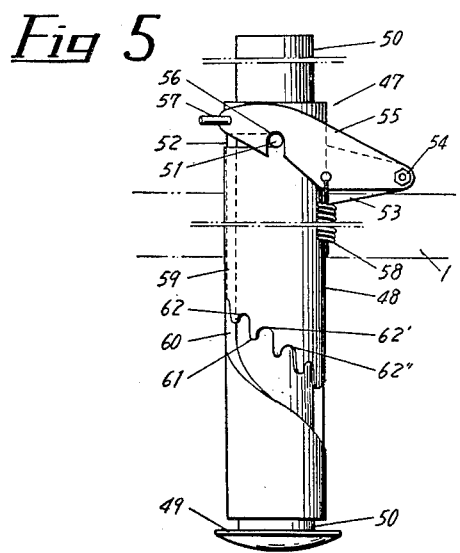
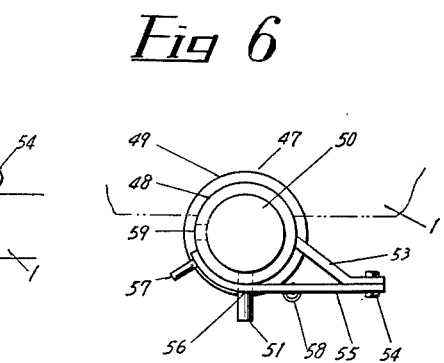

3,066,984
DUMP VEHICLE
Masaki Hori, 357 Imainaka-machi, Kawasaki City, Japan
Filed Mar. 21, 1960, Ser. No. 16,595
2 Claims. (Cl. 298—11)

The present invention relates to a loading and unloading device for a car and more particularly to a device having a lifting mechanism that makes feasible the loading and unloading of the vehicle from high platforms.

The invention will appear more clearly from the following description when taken in connection with the accompanying drawing, in which:

FIG. 3 is a side view of the truck shown in FIG. 2 along the line 3—3, as the rest for receptacle is lowered, mechanical details around the receptacle are omitted.

FIG. 4 is another practical example different from the one shown in FIG. 1, showing a side view of the truck contemplated, as the rest for the receptacle is lifted, mechanical details around the receptacle are omitted.

FIG. 5 is a side view of the principal parts of a support leg, as seen from behind the truck.

FIG. 6 is a top view of the support leg.

Figure 1:
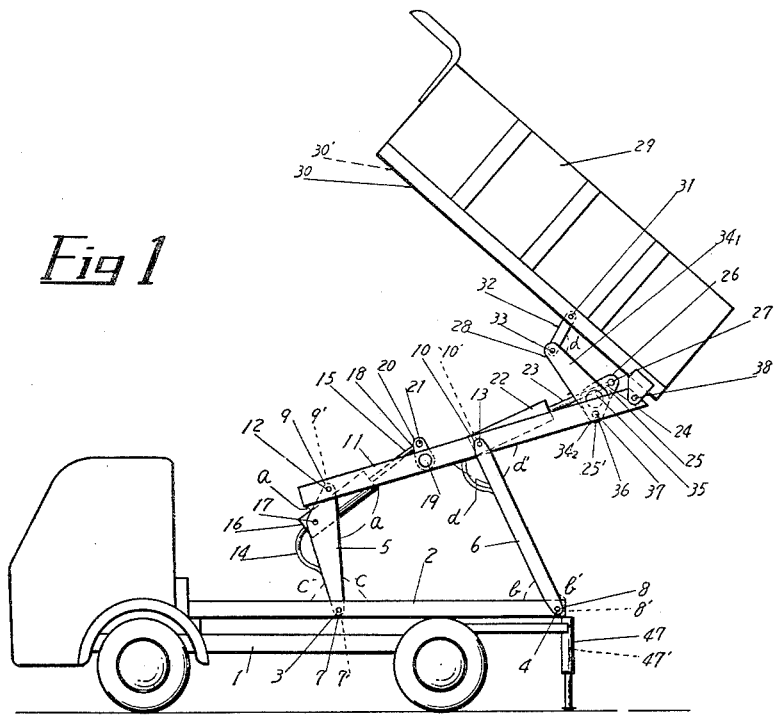
FIG. 1 is an example of a practical application of the present invention showing a longitudinal side view of a truck having the features of the present invention.
Figure 2:
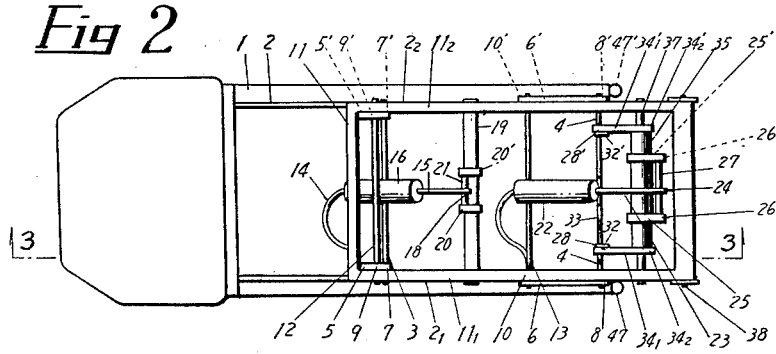
FIG. 2 is a top view of the truck shown in FIG. 1, except that the receptacle for the loading is not shown.

As shown in FIGS. 1 and 2, on the truck body 1, the chassis or the basework 2 for the new device is fixed on the both sides $2_1$, $2_2$ of the truck. Also there is a front bar 3 and the back bar 4, lower ends 7, 7' and 8, 8' of front support arms 5, 5' and back support arms 6, 6'. The upper ends 9, 9', 10, 10' of front support arms 5, 5' and back support arms 6, 6' respectively are coupled to front upper shaft 12 and the back upper shaft 13 respectively on the both sides $11_1$, $11_2$ of the rest 11 for the receptacle. A first fluid working gear, a ram 16, for working the first drive extension lever 15 is to be operated by the driver on the driver's stand by sending fluid through fluid pipe 14, is provided on middle shaft 17, which is on front support arms 5, 5'. The nose 18 of the first drive extension lever 15 is on a short bar 21 on one of the pairs of ends of the coupling arms 20, 20', the other pair of the ends are on intermediate shaft 19 on both sides $11_1$, $11_2$ of rest 11 for the receptacle. On the back upper shaft 13 there is a second fluid working gear, a ram 22, is to be worked like the first fluid working gear 16. The second fluid working gear works the second drive extension lever 23, the nose 24 of which is on the arm shaft 27, fixed firmly across ends 26, 26' of coupled short arm 25, whose base 25', together with coupled bar 35, is on base parts $34_2$, $34_2'$ of the coupled longer arms $34_1$, $34_1'$, which are on the shaft 33 at ends 28, 28'. These ends are on the downward parts of the receptacle lifting levers 32, 32' on shaft 31 on the both sides 30, 30' of the bottom of the receptacle 29. Short arm 25 and longer arm $34_1$, $34_1'$ are disposed to provide a certain desired angle. Both arms $34_1$, $34_1'$ and downward end 36 of short arm 25 are on shaft 37, on the both sides $11_1$, $11_2$ of rest 11 for receptacle. The back of the receptacle 29 is on the back end of the rest 11 for receptacle with the shaft 38.

The device of the present invention enables the driver to work sitting on the driver's stand. FIG. 3 shows a normal state of no working. When the first fluid working gear 16 is set to work, the first drive extension lever extends, the extension works upon a midpoint between middle shaft 17 and intermediate shaft 19, widens the angle $a$ that the rest 11 makes with front support arms 5, 5'. At the same time the front support arms 5, 5' and the back support arms 6, 6' begin to turn upward, according to the radius or length of arm on the front shaft 3 and the back shaft 4 as center respectively in the basework 2 of the framework. The rest 11 carrying receptacle 29 is as FIG. 1 shows, lifted as high as the radius allows, i.e., the lengths of both pairs of support arms 5, 5', 6, 6'. The giving of a slope to the receptacle 29 on rest 11 for loading is, as FIG. 1 shows made on the driver's stand, the second fluid working gear 22 is put into action and works the second drive extension lever 23 and turns short arm 25 upwards and turns longer arms $34_1$, $34_1'$ on shaft 37 as center; as the angle $d$ to be made by the receptacle lifting levers 32, 32' and longer arms $34_1$, $34_1'$ increases, the receptacle 29 turns upward on shaft 38 as center, the front part of the receptacle 29 is lifted and shows a slope. When unloading is over, the second fluid working gear is worked, then the first, either alone or together with the second fluid working gear, so as to put the receptacle in place. The rest 11 for receptacle and the basework for the entire device and the original state is restored, as FIG. 3 shows.

In the present invention, the front and the back support arms may be, as FIG. 4 shows, of equal length. However, it is desirable that the back of the rest 11 for the receptacle should be lifted in a higher position than the front. This is accomplished by having the front support arms 5, 5' shorter in length than the back support arms 6, 6'. With the support arms in this way, it is feasible not only to let the receptacle 29 reach a higher position but this also removes the danger of an unexpected slipdown of the loading out of the receptacle 29 prior to the intended unloading and furthermore works to remove the possibility of unnecessary excessive turning of the front and the back support arms, even when the front support arms come to stand almost vertically, as the back support arms 6, 6' have their upper ends 10, 10' sloping more forward than their lower ends 8, 8'. When, as shown in FIG. 4, the load is very heavy, shaft 39 set at the midpoint of back support arms 6, 6' supports horizontal levers 40, 40', whose both ends 41, 41', 42, 42' are coupled to vertical levers 43, 43', 44, 44', which in turn are coupled to the base 2 of the framework. Back support arms 6, 6' withstand the load assisted by horizontal levers 40, 40' and the vertical levers 43, 43', 44, 44'. This also prevents the truck body from being lifted on the back wheel as axis, when the receptacle 29 shows a slope and center of gravity is shifted to the back of the truck body. In the embodiment of FIG. 3 the first fluid working gear is so placed in position as to increase the angle $b$ to be made by the back support arms 6, 6' and the base 2 of the framework. The first fluid working gear 16 in the example is not necessarily set in a position limited by angles $a$ and $b$, but in any position so as to increase or decrease the angles $a'$, $b'$, $c$, $c'$, $d$, $d'$.

In FIG. 4, if the upper ends 10, 10' and lower ends 8, 8' of back support arms 6, 6' are shifted forward viz., leftward in the figure so that they come nearly directly over, or a little behind the back wheel, and at the same time the horizontal levers 40, 40' are made longer than those shown in FIG. 4, then the position of the first fluid working gear 16 is not subject to angles $b$, $b'$, $d$, $d'$, but may be placed either between support arms 6, 6' and horizontal levers 40, 40' or between these and the vertical levers 43, 43'.

With the present invention, as stated above, there is a possibility that the front part of the car body should be lifted, when unloading is made by lifting the receptacle 29 to a high position. In order to prevent this, the truck body 1 is provided with a pair of support legs 47, 47' with their sides firmly set against each other on the back of the car, as FIGS. 1, 2, and 4 show. These support legs 47, 47' are shown in FIG. 5, as seen from behind the truck.

The figure shows the one on the left side, and there is another set on the right. The cylinder 48 has a leg bar 50 with a dished end 49 at the bottom. When the truck is moving, protruding handle 51, fixed to the wall of the bar 50, rests on a horizontal slit 52 and is retained by a slot 56 in bent lock plate 55 pivoted by fastening means 54 to a support plate 53 fixed to cylinder 48. Lock plate 55, which has a small projection 57, is being drawn downward by a spring 58 on the cylinder 48. The leg bar 50 is normally in the position shown in FIG. 5 with the handle 51 resting on the horizontal slit 52. When unloading takes place, the small projection 57 is lifted, the handle 51 lets go from slot 56 and moves sideways along the horizontal slit 52 until it glides down into a vertical slit 59, which leads to horizontal slit 52. The handle 51 drops down to a sliding wall 60 which is opposite a wavy toothed wall 61 or a curved slit with its upper side indented in toothed wavy form. The bottoms 62, 62′, 62″ of these teeth fix the height from the ground from which part of the leg bar 50 will extend down to reach the ground and support the truck. The handle may rest in any of the teeth bottoms 62, 62′, 62″ necessary to withstand the weight on the truck.

What is claimed:

1. In a dump vehicle, in combination, a horizontal chassis including a rear end; a dump body support frame juxtaposed over said chassis; a dump body mounted on said support frame; first jack means including vertically pivotal first support arm means for raising said dump body vertically and longitudinally rearwardly off said chassis, said support arm means being pivotally connected to an intermediate portion of said chassis and adjacent a forward portion of said support frame, second support arm means pivotally connected intermediately of said support frame and adjacent the rear end of said chassis, said first and second support arm means comprising pairs of arms, scissor levers pivotally connected to said chassis, support frame and an intermediate portion of the pair of arms of said second support arm means, said first jack means including an extendible fluid motor connected at opposite ends between said chassis and said second support arm means, said dump body being pivotally mounted on said support frame adjacent a rear end portion thereof; second jack means disposed between said dump body and said support frame forwardly of the pivotal connection between said dump body and said support frame; first actuating means operatively connected to said first jack means to operate the same independently to raise said support frame; and second actuating means operatively connected to said second jack means to operate said second jack means for independently pivoting said dump body about its pivotal connection with said support frame.

2. The structure of claim 1; and extendible support means depending from the rear end of said chassis to maintain the horizontal stability of said chassis when a portion of the dump body is disposed beyond the rear end thereof.

References Cited in the file of this patent

UNITED STATES PATENTS

| | | |
|---|---|---|
| 1,597,544 | Rodenhausen | Aug. 24, 1926 |
| 2,203,059 | Palm | June 4, 1940 |
| 2,219,525 | Maxon | Oct. 29, 1940 |
| 2,494,377 | Cresci | Jan. 10, 1950 |

FOREIGN PATENTS

| | | |
|---|---|---|
| 936,978 | Germany | Dec. 22, 1955 |
| 252,924 | Japan | June 30, 1959 |